(12) United States Patent
Kawasumi et al.

(10) Patent No.: US 9,000,704 B2
(45) Date of Patent: Apr. 7, 2015

(54) THREE-PHASE MOTOR DRIVING APPARATUS AND THREE-PHASE MOTOR DRIVING METHOD

(75) Inventors: Shinji Kawasumi, Hanno (JP); Tomohiro Kurokawa, Hanno (JP)

(73) Assignee: Shindengen Electric Manufacturing Co., Ltd., Tokyo (JP)

( * ) Notice: Subject to any disclaimer, the term of this patent is extended or adjusted under 35 U.S.C. 154(b) by 35 days.

(21) Appl. No.: 13/981,594

(22) PCT Filed: Aug. 2, 2012

(86) PCT No.: PCT/JP2012/069658
§ 371 (c)(1),
(2), (4) Date: Jul. 24, 2013

(87) PCT Pub. No.: WO2014/020736
PCT Pub. Date: Feb. 6, 2014

(65) Prior Publication Data
US 2014/0035503 A1    Feb. 6, 2014

(51) Int. Cl.
*H02K 29/08*    (2006.01)
*H02P 6/16*    (2006.01)
*H02P 6/18*    (2006.01)

(52) U.S. Cl.
CPC . *H02P 6/16* (2013.01); *H02P 6/185* (2013.01)

(58) Field of Classification Search
USPC ...................................... 318/400.38, 73, 148
See application file for complete search history.

(56) References Cited

U.S. PATENT DOCUMENTS

| 2003/0184248 | A1* | 10/2003 | Muroi et al. ................... 318/466 |
| 2005/0073279 | A1* | 4/2005 | Fenley .......................... 318/717 |
| 2006/0055352 | A1* | 3/2006 | Mori et al. .................... 318/432 |
| 2006/0197480 | A1* | 9/2006 | Mori et al. .................... 318/254 |
| 2008/0048598 | A1* | 2/2008 | Shibuya ..................... 318/400.1 |
| 2012/0161680 | A1* | 6/2012 | Kitagawa ................. 318/400.04 |
| 2013/0113400 | A1* | 5/2013 | Kishimoto et al. ...... 318/400.14 |

FOREIGN PATENT DOCUMENTS

| JP | 09-163787 | 6/1997 |
| JP | 11-146683 | 5/1999 |
| JP | 2005-312216 | 11/2005 |
| JP | 2006-166564 | 6/2006 |
| JP | 2010-239748 | 10/2010 |
| JP | 2012-010456 | 1/2012 |

OTHER PUBLICATIONS

International Search Report for PCT/JP2012/069658, mailed on Oct. 30, 2012.
English translation of ISR for related PCT/JP2012/069658 mailed on Oct. 30, 2012.

* cited by examiner

*Primary Examiner* — Kawing Chan
*Assistant Examiner* — Zoheb Imitiaz
(74) *Attorney, Agent, or Firm* — Ladas & Parry, LLP

(57) ABSTRACT

The three-phase motor driving apparatus according to an aspect of the present invention comprises a controlling part that estimates a rotational position of the three-phase brushless motor based on a reference pulse signal output by the rotor sensor according to a rotational position of the magnetic pole of the first phase of the rotor when the three-phase brushless motor rotates, and controls the motor driver in driving patterns sequentially prescribed so as to correspond to the estimated rotational position of the three-phase brushless motor.

14 Claims, 5 Drawing Sheets

THREE-PHASE MOTOR DRIVING APPARATUS AND THREE-PHASE MOTOR DRIVING METHOD

CROSS-REFERENCE TO A RELATED APPLICATION

This application is a national stage of International Patent Application no. PCT/JP2012/069658, filed Aug. 2, 2012, the disclosure of which is incorporated herein by reference in its entirety.

TECHNICAL FIELD

The present invention relates to a three-phase motor driving apparatus and a three-phase motor driving method.

BACKGROUND ART

A typical conventional three-phase motor driving apparatus detects magnetic poles of three phases of a rotor with three rotor sensors, and acquires information on the rotational position of the rotor based on three pulse signals output by the rotor sensors based on the detection result.

The conventional three-phase motor driving apparatus, which uses three expensive rotor sensors, requires harnesses and terminals to be connected to the rotor sensors and therefore has a problem that the manufacturing cost of the system increases.

In addition, the rotor sensors have to be positioned with high precision in order to output precise detection signals. Therefore, there is also a problem that the yield of the products decreases as the number of rotor sensors increases.

For example, the three-phase motor driving apparatus described in JP2010-239748A estimates the rotational position of the rotor with one rotor sensor to drive a three-phase brushless motor.

Specifically, with the three-phase motor driving apparatus, in a reference energization cycle in which the U phase, the V phase and the W phase are configured to be shifted from each other by an electrical angle of 120°, a half of the cycle following the time when the U phase as a reference is turned on or off is equally divided into three phases, a former phase, a middle phase and a later phase. Based on these phases, the state of energization of the three-phase brushless motor is controlled.

With the three-phase motor driving apparatus described in JP2010-239748A described above, a half cycle is always equally divided into three phases, the former phase, the middle phase and the later phase, and therefore the influence of a variation of the rotation speed of the three-phase brushless motor is not taken into account.

That is, the three-phase motor driving apparatus cannot properly estimate the rotational position of the rotor if the rotation speed of the three-phase brushless motor varies.

DISCLOSURE OF THE INVENTION

A three-phase motor driving method according to an embodiment of an aspect of the present invention is a three-phase motor driving method of controlling driving of a three-phase brushless motor using only one rotor sensor that detects a magnetic pole of a first phase of a rotor of the three-phase brushless motor, the three-phase motor driving method being implemented by a three-phase motor driving apparatus comprising a motor driver that supplies a driving current to the three-phase brushless motor to drive the three-phase brushless motor and a controlling part that estimates a rotational position of the three-phase brushless motor based on a reference pulse signal output by the rotor sensor according to a rotational position of the magnetic pole of the first phase of the rotor when the three-phase brushless motor rotates, and controls the motor driver in driving patterns sequentially prescribed so as to correspond to the estimated rotational position of the three-phase brushless motor, wherein the controlling part estimates the rotational position of the three-phase brushless motor based on the reference pulse signal, a first timing, a second timing and a third timing, the first timing being estimated to correspond to a rotational position of a magnetic pole of a second phase of the rotor and prescribing a time when one third of a first reference period has elapsed from a first edge of the reference pulse signal, the second timing being estimated to correspond to a rotational position of a magnetic pole of a third phase of the rotor and prescribing a time when two thirds of the first reference period have elapsed from the first edge of the reference pulse signal, and the third timing being estimated to correspond to the rotational position of the magnetic pole of the first phase of the rotor and prescribing a time when the first reference period has elapsed from the first edge of the reference pulse signal, and the first reference period is a period between the first edge and a second edge of the reference pulse signal that immediately precedes the first edge.

In the three-phase motor driving method, wherein the controlling part may prescribe a fourth timing that prescribes a time when one third of a second reference period has elapsed from a third edge of the reference pulse signal that immediately follows the first edge, may prescribe a fifth timing that rises when two thirds of the second reference period have elapsed from the third edge, and may prescribe a sixth timing that is estimated to correspond to the rotational position of the magnetic pole of the first phase of the rotor and prescribes a time when the second reference period has elapsed from the third edge of the reference pulse signal, and the second reference period may be a period between the first edge and the third edge.

In the three-phase motor driving method, wherein in a case where the third edge occurs between the first timing and the second timing, the controlling part may control the motor driver so as to become a state without any load on the three-phase brushless motor.

In the three-phase motor driving method, wherein in the case where the third edge occurs between the first timing and the second timing, before the fourth timing, the controlling part controls the motor driver to become a state without any load on the three-phase brushless motor and then controls the motor driver in a driving pattern for the third edge.

In the three-phase motor driving method, wherein in the case where the third edge occurs between the first timing and the second timing, the controlling part controls the motor driver in a driving pattern that follows a driving pattern prescribed so as to correspond to the rotational position of the three-phase brushless motor immediately before the third edge occurs.

In the three-phase motor driving method, wherein the controlling part controls the motor driver in prescribed sequential driving patterns from a timing of the third edge to the fourth timing.

In the three-phase motor driving method, wherein in a case where the third edge does not occur before the third timing, the controlling part controls the motor driver so as to become a state without any load on the three-phase brushless motor.

In the three-phase motor driving method, wherein in the case where the third edge does not occur before the third timing, the controlling part controls the motor driver so as to short-circuit coils of the three-phase brushless motor.

In the three-phase motor driving method, wherein in a case where the third edge occurs at the third timing, at a timing of the third edge, the motor driver is controlled in a driving pattern prescribed so as to correspond to the rotational position of the three-phase brushless motor estimated from the reference pulse signal, the first timing, the second timing and the third timing.

In the three-phase motor driving method, wherein in a case where the third edge occurs between the second timing and the third timing, at a timing of the third edge, the motor driver is controlled in a driving pattern prescribed so as to correspond to the rotational position of the three-phase brushless motor estimated from the reference pulse signal, the first timing and the second timing.

In the three-phase motor driving method, wherein magnetic pole of the first phase of the rotor is magnetic pole of U phase of the rotor, magnetic pole of the second phase of the rotor is magnetic pole of V phase of the rotor, magnetic pole of the third phase of the rotor is magnetic pole of W phase of the rotor.

In the three-phase motor driving method, wherein the three-phase motor driving apparatus comprises a reference pulse signal input terminal that receives the reference pulse signal.

In the three-phase motor driving method, wherein the rotor sensor is disposed inside the stator of the three-phase brushless motor or inside an outer sheath of the three-phase brushless motor.

A three-phase motor driving apparatus according to an embodiment of an aspect of the present invention is a three-phase motor driving apparatus of controlling driving of a three-phase brushless motor using only one rotor sensor that detects a magnetic pole of a first phase of a rotor of the three-phase brushless motor, comprising:

a motor driver that supplies a driving current to the three-phase brushless motor to drive the three-phase brushless motor; and a controlling part that estimates a rotational position of the three-phase brushless motor based on a reference pulse signal output by the rotor sensor according to a rotational position of the magnetic pole of the first phase of the rotor when the three-phase brushless motor rotates, and controls the motor driver in driving patterns sequentially prescribed so as to correspond to the estimated rotational position of the three-phase brushless motor, wherein the controlling part estimates the rotational position of the three-phase brushless motor based on the reference pulse signal, a first timing, a second timing and a third timing, the first timing being estimated to correspond to a rotational position of a magnetic pole of a second phase of the rotor and prescribing a time when one third of a first reference period has elapsed from a first edge of the reference pulse signal, the second timing being estimated to correspond to a rotational position of a magnetic pole of a third phase of the rotor and prescribing a time when two thirds of the first reference period have elapsed from the first edge of the reference pulse signal, and the third timing being estimated to correspond to the rotational position of the magnetic pole of the first phase of the rotor and prescribing a time when the first reference period has elapsed from the first edge of the reference pulse signal, and the first reference period is a period between the adjacent two edge of the reference pulse signal.

A three-phase motor driving apparatus according to an aspect of the present invention includes a controlling part that estimates a rotational position of a three-phase brushless motor based on a reference pulse signal output by a rotor sensor according to a rotational position of a magnetic pole of a first phase of a rotor when the three-phase brushless motor rotates, and controls a motor driver in driving patterns sequentially prescribed so as to correspond to the estimated rotational position of the three-phase brushless motor.

The controlling part estimates the rotational position of the three-phase brushless motor based on a first timing, a second timing and a third timing, the first timing being estimated to correspond to a rotational position of a magnetic pole of a second phase of the rotor and prescribing a time when one third of a first reference period has elapsed from a first edge of the reference pulse signal, the second timing being estimated to correspond to a rotational position of a magnetic pole of a third phase of the rotor and prescribing a time when two thirds of the first reference period have elapsed from the first edge of the reference pulse signal, and the third timing being estimated to correspond to the rotational position of the magnetic pole of the first phase of the rotor and prescribing a time when the first reference period has elapsed from the first edge of the reference pulse signal.

The first reference period is a period between two adjacent edges of the reference pulse signal. In particular, the first reference period is a period between the first edge and a second edge of the reference pulse signal that immediately precedes the first edge.

In this way, the number of rotor sensors can be smaller than conventional, and the rotational position of the rotor can be more properly estimated in response to the variation of the rotation speed of the three-phase brushless motor.

In addition, the number of expensive rotor sensors and the number of harnesses and terminals to be connected to the rotor sensors can be reduced.

In addition, since the number of rotor sensors can be reduced, the yield of the products can be improved accordingly.

As a result, the manufacturing cost of the controlling system for a cell and a dynamo to which the three-phase motor driving method and the three-phase motor driving apparatus according to the present invention are applied can be reduced, for example.

BEST MODE FOR CARRYING OUT THE INVENTION

Figure 1:
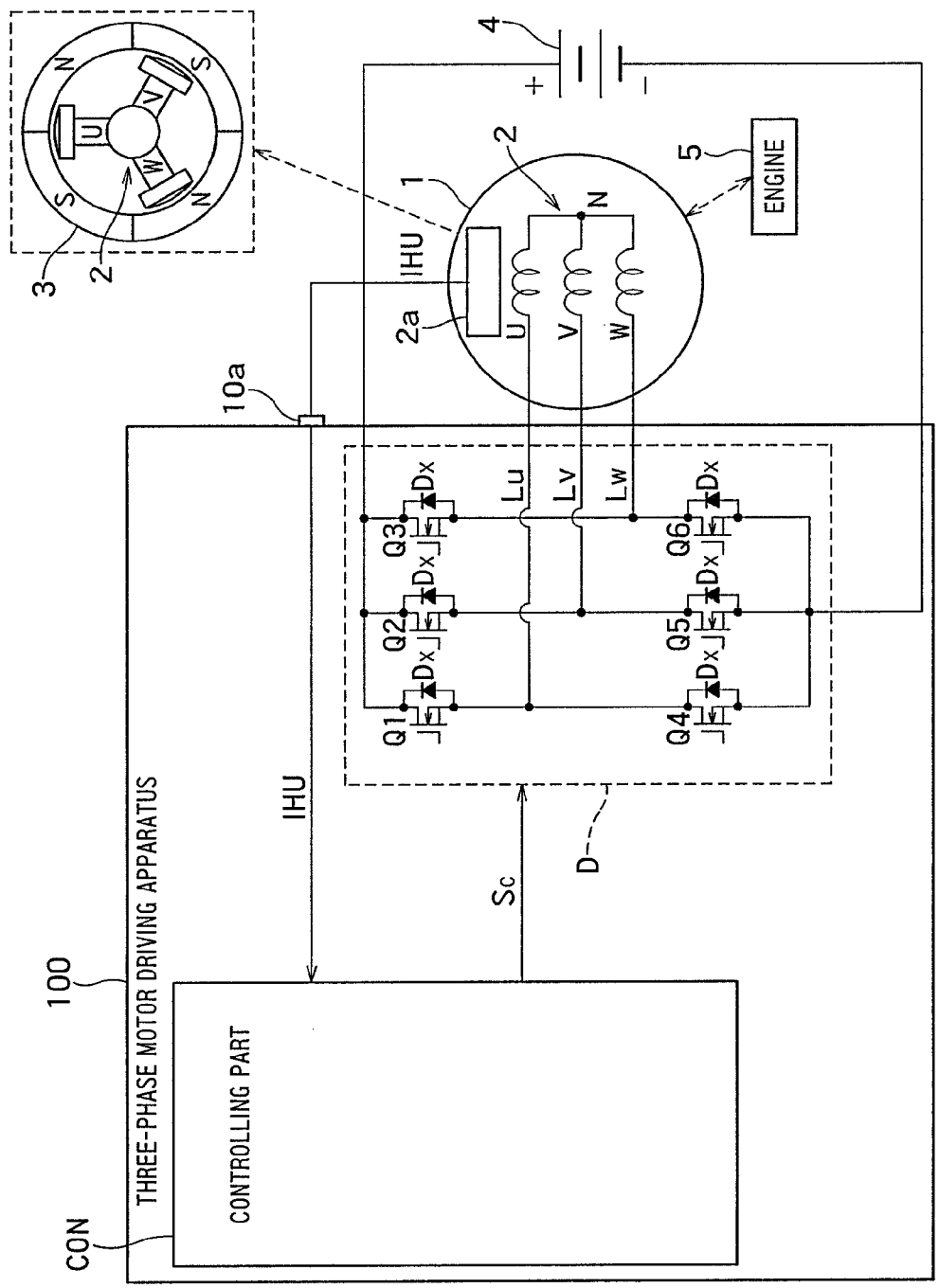
FIG. 1 is a diagram showing an example of a configuration of a three-phase motor driving system 1000 according to an embodiment 1, which is an aspect of the present invention.

In the following, an embodiment of the present invention will be described with reference to the drawings.
[Embodiment 1]
FIG. 1 is a diagram showing an example of a configuration of a three-phase motor driving system 1000 according to an embodiment 1, which is an aspect of the present invention.

As shown in FIG. 1, the three-phase motor driving system 1000 includes a three-phase motor driving apparatus 100, a three-phase brushless motor 1 and a battery 4.

In FIG. 1, the three-phase brushless motor 1 is a stator motor of an engine 5, for example. The three-phase brushless motor 1 includes a stator 2 having coils of U, V and W phases (coils wound around the respective cores) and a neutral conductor "N" of the coils, and a rotor 3 having a four-pole permanent magnet (which has two pairs of N and S poles). The coils of the three phases (U, V and W) are wound around the stator 2 sequentially in the circumferential direction.

The three-phase brushless motor 1 further has a rotor sensor 2a that detects the magnetic pole of a first phase (U phase, for example) of the rotor 3. The rotor sensor 2a is configured to output a reference pulse signal "IHU" that corresponds to the rotational position of the magnetic pole of the U phase (first phase) of the rotor 3.

The rotor sensor 2a is disposed inside the stator 2 of the three-phase brushless motor 1 or inside an outer sheath of the three-phase brushless motor 1, for example. The rotor sensor 2a is a Hall element, for example.

The battery 4 is a direct-current power supply, and the three-phase motor driving apparatus 100 is configured to convert a direct-current voltage from the battery 4 into an alternating-current voltage to drive the three-phase brushless motor 1.

The three-phase motor driving apparatus 100 has a motor driver (three-phase bridge circuit) D and a controlling part CON.

A reference pulse signal input terminal 10a is configured to receive the reference pulse signal "IHU" output from the rotor sensor 2a.

The motor driver D is configured to supply a driving current to the three-phase brushless motor 1 to drive the three-phase brushless motor 1.

As shown in FIG. 1, the motor driver D has switch elements "Q1", "Q2", "Q3", "Q4", "Q5" and "Q6", which are constituted by nMOS transistors, for example.

In the motor driver D, drain terminals of the switch elements "Q1", "Q2" and "Q3" provided on an upper arm side are commonly connected to a positive-side terminal of the battery 4, which is a direct-current power supply.

Source terminals of the switch elements "Q4", "Q5" and "Q6" provided on a lower arm side are commonly connected to a negative-side terminal of the battery 4, which is a direct-current power supply.

A source terminal of the switch element "Q1" on the upper arm side and a drain terminal of the switch element "Q4" on the lower arm side are connected to each other, and the point of connection between the switch elements "Q1" and "Q4" is connected to a U-phase coil terminal of the three-phase brushless motor 1 by an output power supply line "Lu".

A source terminal of the switch element "Q2" on the upper arm side and a drain terminal of the switch element "Q5" on the lower arm side are connected to each other, and the point of connection between the switch elements "Q2" and "Q5" is connected to a V-phase coil terminal of the three-phase brushless motor 1 by an output power supply line "Lv".

A source terminal of the switch element "Q3" on the upper arm side and a drain terminal of the switch element "Q6" on the lower arm side are connected to each other, and the point of connection between the switch elements "Q3" and "Q6" is connected to a W-phase coil terminal of the three-phase brushless motor 1 by an output power supply line "Lw".

It is noted that each of the switch elements "Q1", "Q2", "Q3", "Q4", "Q5" and "Q6" is connected in parallel with a fly-wheel diode "DX".

The switch elements "Q1", "Q2", "Q3", "Q4", "Q5" and "Q6" may be constituted by insulated gate bipolar transistors (IGBT) or bipolar transistors.

The switch elements "Q1", "Q2", "Q3", "Q4", "Q5" and "Q6" are driven by a gate driving signal "Sc" output from the controlling part CON. Once the switch elements are driven, a driving current flows through the three-phase brushless motor 1. The operation of the three-phase brushless motor 1 is controlled in response to the driving current.

In other words, the gate driving signal "Sc" prescribes the driving pattern of the three-phase brushless motor 1.

For example, in a case where the three-phase brushless motor 1 is controlled to rotate in a predetermined direction, six types of driving patterns (0), (1), (2), (3), (4) and (5) are prescribed (see FIGS. 2, 3, 4 and 5 described later). The six types of driving patterns are sequentially assigned to six divisional periods of one period (one cycle) of one rotation of the three-phase brushless motor 1. The six types of driving patterns themselves are typical patterns for controlling turning on and off of the switch elements "Q1", "Q2", "Q3", "Q4", "Q5" and "Q6" to control the three-phase brushless motor 1 to rotate in a predetermined direction.

The gate driving signal "Sc" may prescribe a driving pattern to remove any load on the three-phase brushless motor 1 or a driving pattern to short-circuit each coil of the three-phase brushless motor 1. It is noted that these driving patterns are also typical patterns.

The controlling part CON is configured to estimate the rotational position of the three-phase brushless motor 1 based on the reference pulse signal "IHU" output by the rotor sensor 2a according to the rotational position of the magnetic pole of the U phase (first phase) of the rotor 3 when the three-phase brushless motor 1 rotates.

For example, the controlling part CON is configured to estimate the rotational position of the three-phase brushless motor 1 based on the reference pulse signal "IHU", a first timing "X1", a second timing "X2" and a third timing "X3", the first timing "X1" being estimated to correspond to the rotational position of the magnetic pole of a V phase (second phase) of the rotor 3 and prescribing a time when a first period (⅓ T), which is one third of a first reference period "T", has elapsed from a first edge "E1" of the reference pulse signal "IHU", the second timing "X2" being estimated to correspond to the rotational position of the magnetic pole of a W phase (third phase) of the rotor 3 and prescribing a time when a second period (⅔ T), which is two thirds of the first reference period "T", has elapsed from the first edge "E1" of the reference pulse signal "IHU", and the third timing "X3" prescribing a time when the first reference period "T" has elapsed from the first edge "E1" of the reference pulse signal "IHU".

The controlling part CON is further configured to output the gate driving signal "Sc" described above based on the estimated rotational position of the three-phase brushless motor 1.

In other words, the controlling part CON is configured to control the motor driver D with the gate driving signal "Sc" described above, thereby controlling the motor driver in the six types of driving patters (0), (1), (2), (3), (4) and (5) that are sequentially prescribed according to the estimated rotational position of the three-phase brushless motor 1.

Next, there will be described an example of a three-phase motor driving method for the three-phase motor driving apparatus 100 configured as described above to estimate the rotational position of the three-phase brushless motor 1 and control driving of the three-phase brushless motor 1 based on the estimated rotational position.

Figure 2:
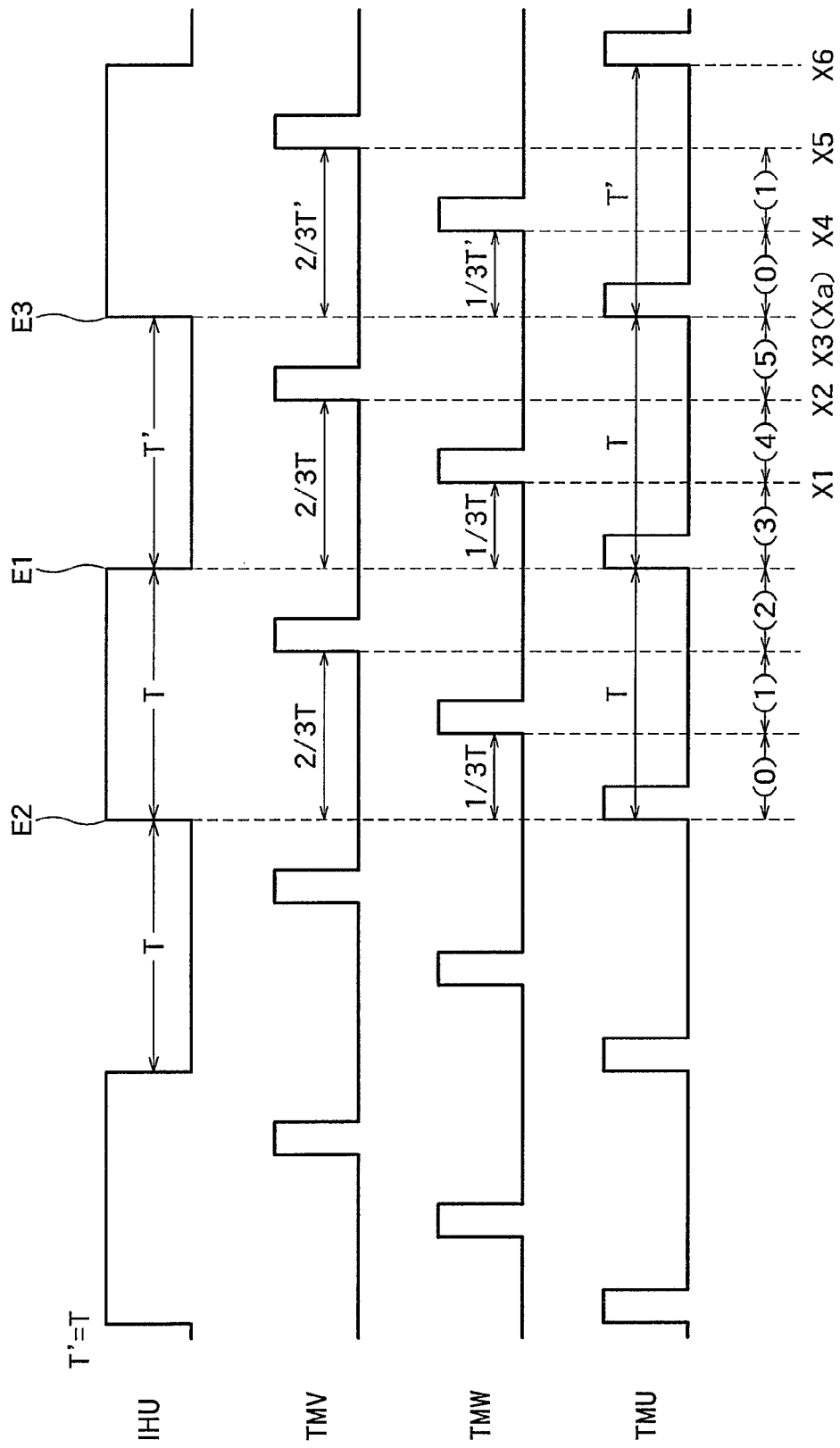
FIG. 2 is a diagram showing an example of the reference pulse signal "IHU", a first estimation pulse signal "TMV", a second estimation pulse signal "TMW" and a third estimation pulse signal "TMU" in a case where the three-phase brushless motor 1 is rotating at a constant speed ("T'"="T").
Figure 3:
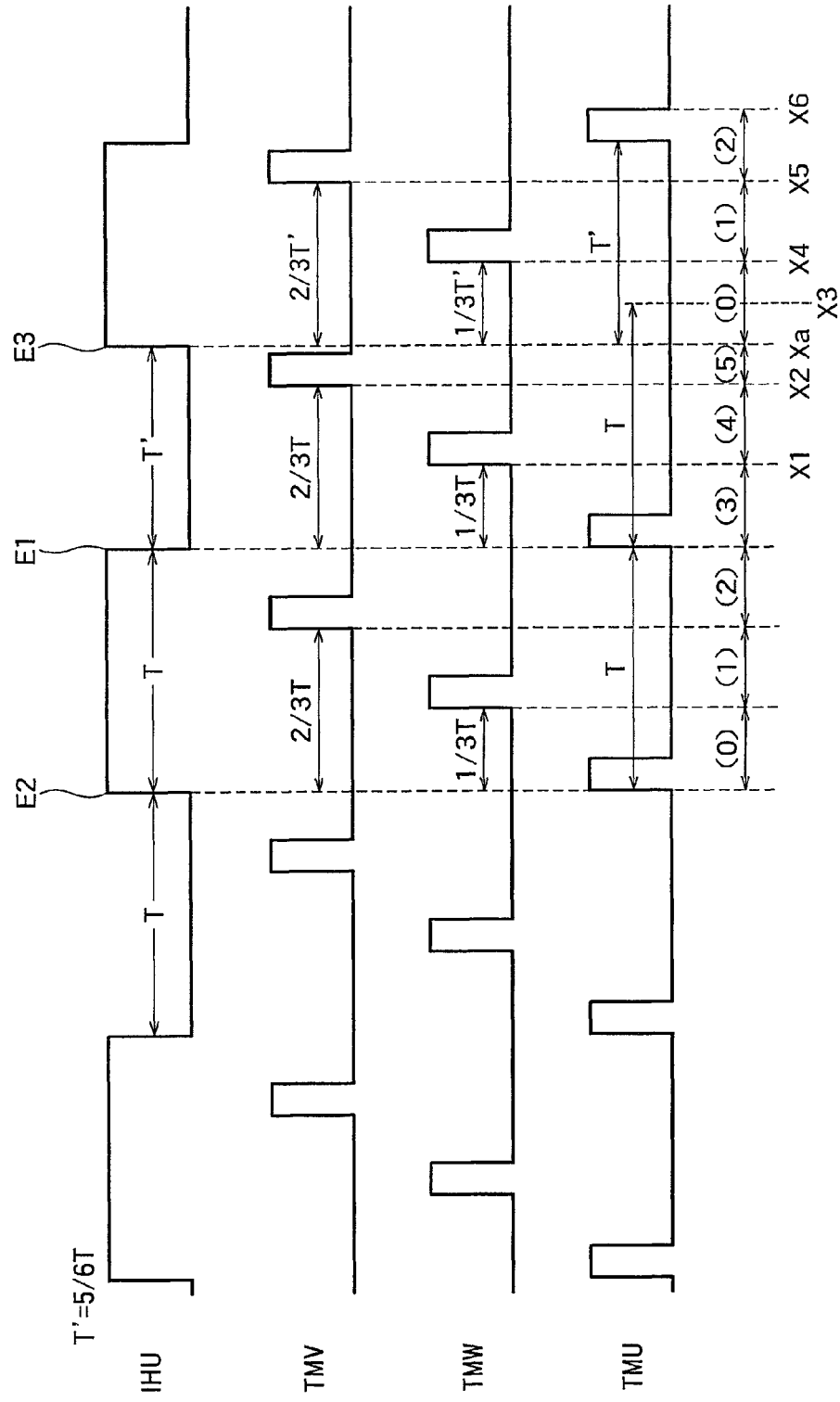
FIG. 3 is a diagram showing an example of the reference pulse signal "IHU", the first estimation pulse signal "TMV", the second estimation pulse signal "TMW" and the third estimation pulse signal "TMU" in a case where the three-phase brushless motor 1 accelerates ("T'"=⅚ "T").
Figure 4:
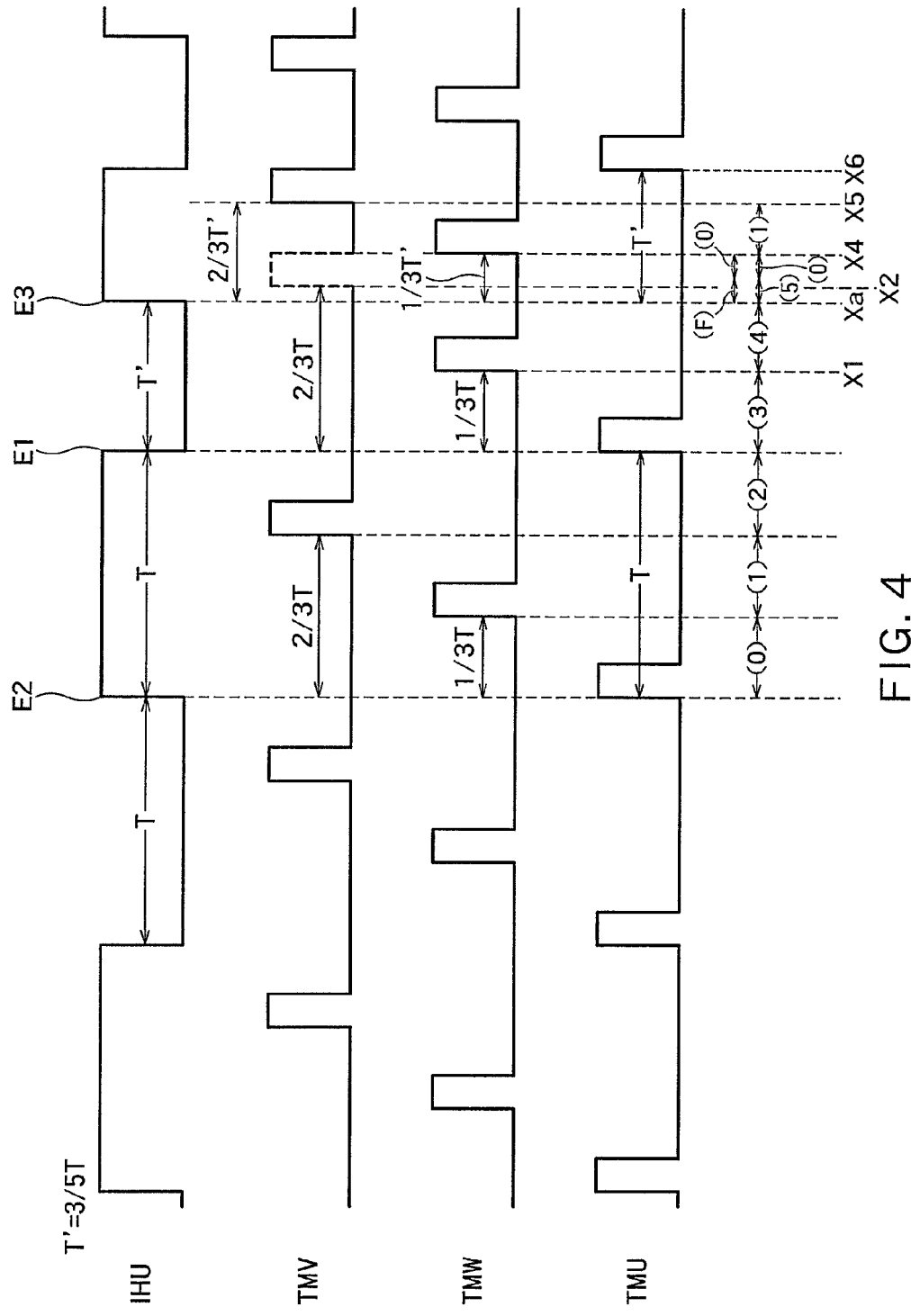
FIG. 4 is a diagram showing an example of the reference pulse signal "IHU", the first estimation pulse signal "TMV", the second estimation pulse signal "TMW" and the third estimation pulse signal "TMU" in a case where the three-phase brushless motor 1 accelerates ("T'"=⅗ "T").
Figure 5:
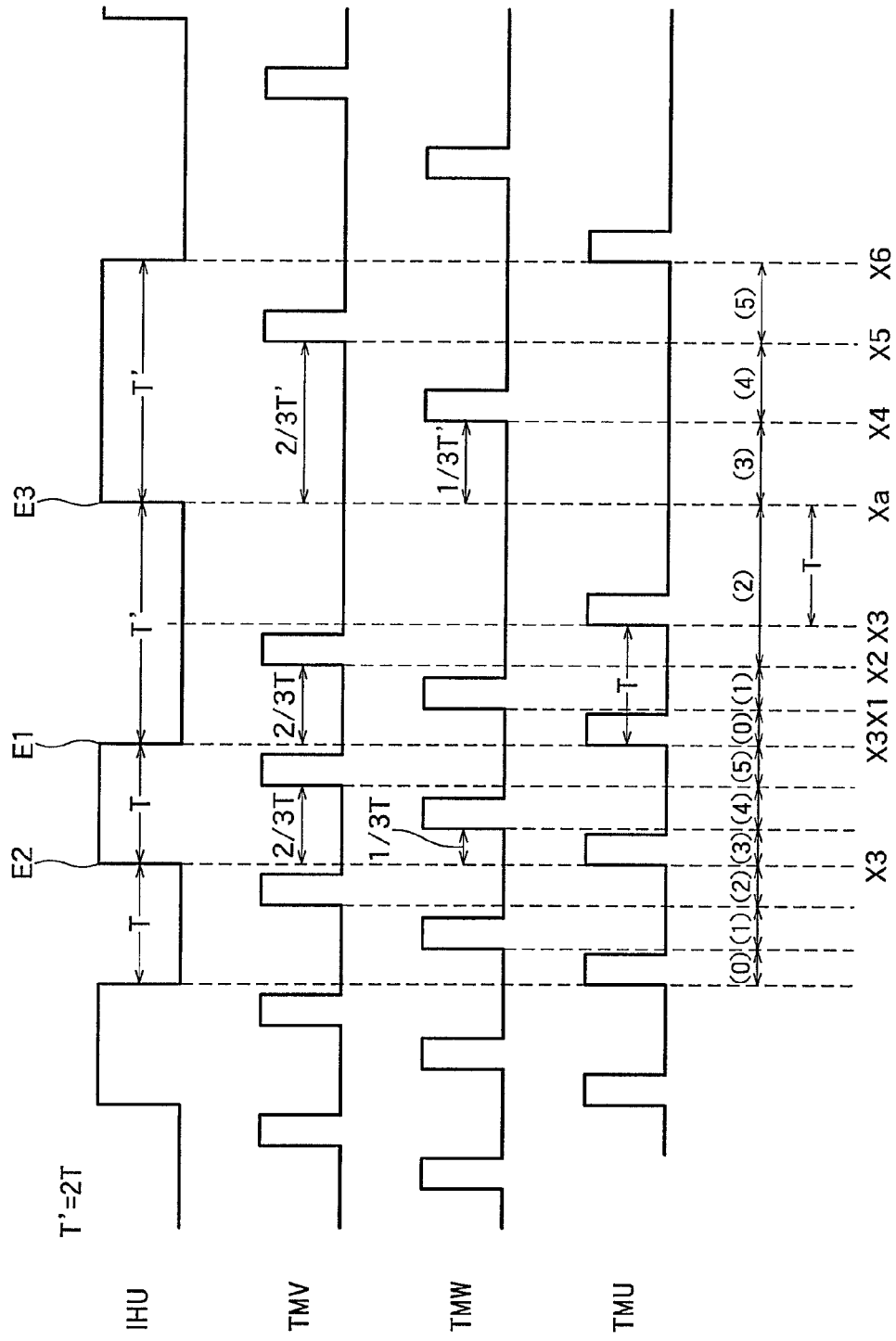
FIG. 5 is a diagram showing an example of waveforms of the reference pulse signal "IHU", the first estimation pulse signal "TMV", the second estimation pulse signal "TMW" and the third estimation pulse signal "TMU" in the case where the three-phase brushless motor 1 decelerates ("T"=2 "T").

FIG. 2 is a diagram showing an example of the reference pulse signal "IHU", a first estimation pulse signal "TMV", a second estimation pulse signal "TMW" and a third estimation pulse signal "TMU" in a case where the three-phase brushless motor 1 is rotating at a constant speed ("T'"="T"). FIG. 3 is a diagram showing an example of the reference pulse signal "IHU", the first estimation pulse signal "TMV", the second estimation pulse signal "TMW" and the third estimation pulse signal "TMU" in a case where the three-phase brushless motor 1 accelerates ("T'"=5/6 "T"). FIG. 4 is a diagram showing an example of the reference pulse signal "IHU", the first estimation pulse signal "TMV", the second estimation pulse signal "TMW" and the third estimation pulse signal "TMU" in a case where the three-phase brushless motor 1 accelerates ("T'"=3/5 "T"). FIG. 5 is a diagram showing an example of waveforms of the reference pulse signal "IHU", the first estimation pulse signal "TMV", the second estimation pulse signal "TMW" and the third estimation pulse signal "TMU" in the case where the three-phase brushless motor 1 decelerates ("T'"=2 "T").

The rotor sensor 2*a* sets the reference pulse signal "IHU" at a "High" level for a predetermined time when the rotor sensor 2*a* detects the magnetic pole of the first phase (U phase) of the rotor 3. One period of one rotation of the rotor 3 corresponds to a series of one period for which the reference pulse signal "IHU" is set at the "High" level and the following one period for which the reference pulse signal "IHU" is set at a "Low" level.

The controlling part CON generates the first estimation pulse signal "TMV", the second estimation pulse signal "TMW" and the third estimation pulse signal "TMU" based on the reference pulse signal "IHU" through a processing performed by internal software, for example. It is noted that the first estimation pulse signal "TMV", the second estimation pulse signal "TMW" and the third estimation pulse signal "TMU" are processed in the controlling part CON to prescribe the timings described later.

As shown in FIGS. 2, 3, 4 and 5, the first estimation pulse signal "TMV" contains a pulse that is estimated to correspond to the rotational position of the magnetic pole of the V phase (second phase) of the rotor 3, for example. The pulse rises when the first period (1/3 "T"), which is one third of the first reference period "T", has elapsed from the first edge "E1" of the reference pulse signal "IHU".

As shown in FIGS. 2, 3, 4 and 5, the second estimation pulse signal "TMW" contains a pulse that is estimated to correspond to the rotational position of the magnetic pole of the W phase (third phase) of the rotor 3, for example. The pulse rises when the second period (2/3 "T"), which is two thirds of the first reference period "T", has elapsed from the first edge "E1" of the reference pulse signal "IHU".

As shown in FIGS. 2, 3, 4 and 5, the third estimation pulse signal "TMU" contains a pulse that is estimated to correspond to the rotational position of the magnetic pole of the U phase (first phase) of the rotor 3, for example. The pulse includes a pulse that rises when the first reference period "T" has elapsed from the first edge "E1" of the reference pulse signal "IHU".

From the first estimation pulse signal "TMV", the controlling part CON prescribes the first timing "X1", which prescribes the time when the first period (1/3 "T"), which is one third of the first reference period "T", has elapsed from the first edge "E1" of the reference pulse signal "IHU" (a phase shifted from a second edge "E2" by 120° (an electrical angle of 240°)).

From the second estimation pulse signal "TMW", the controlling part CON prescribes the second timing "X2", which prescribes the time when the second period (2/3 "T"), which is two thirds of the first reference period "T", has elapsed from the first edge "E1" of the reference pulse signal "IHU" (a phase shifted from the second edge "E2" by 150° (an electrical angle of 300°)).

From the third estimation pulse signal "TMU", the controlling part CON prescribes the third timing "X3", which prescribes the time when the first reference period "T" has elapsed from the first edge "E1" of the reference pulse signal "IHU" (a phase shifted from the second edge "E2" by 180° (an electrical angle of 360°)).

The first reference period "T" is a period between two adjacent edges of the reference pulse signal "IHU". For example, the first reference period "T" is a period between the first edge "E1" and the second edge "E2" of the reference pulse signal "IHU" that immediately precedes the first edge "E1".

The controlling part CON further prescribes a fourth timing "X4", which prescribes the time when a third period (1/3 "T'"), which is one third of a second reference period "T'", has elapsed from a third edge "E3" of the reference pulse signal "IHU" that immediately follows the first edge "E1" (a phase shifted from the first edge "E1" by 120° (an electrical angle of 240°)).

From the second estimation pulse signal "TMV", the controlling part CON further prescribes a fifth timing "X5", which prescribes the time when a fourth period (2/3 "T'"), which is two thirds of the second reference period "T'", has elapsed from the third edge "E3" (a phase shifted from the first edge "E1" by 150° (an electrical angle of 300°)).

The second reference period "T'" is a period between the first edge "E1" and the third edge "E3".

Based on the premise described above, first, a case where the three-phase brushless motor 1 is rotating at a constant speed ("T'"="T") (shown in FIG. 2) will be described. In this case, the third edge "E3" occurs at the third timing (that is, a timing "Xa" and the third timing "X3" coincide with each other).

The controlling part CON estimates the rotational position of the three-phase brushless motor 1 based on the reference pulse signal "IHU", the first timing "X1", the second timing "X2" and the third timing "X3", the first timing "X1" being estimated to correspond to the rotational position of the magnetic pole of the V phase (second phase) of the rotor 3 and prescribing the time when the first period (1/3 "T"), which is one third of the first reference period "T", has elapsed from the first edge "E1" of the reference pulse signal "IHU", the second timing "X2" being estimated to correspond to the rotational position of the magnetic pole of the W phase (third phase) of the rotor 3 and prescribing the time when the second period (2/3 "T"), which is two thirds of the first reference period "T", has elapsed from the first edge "E1" of the reference pulse signal "IHU", and the third timing "X3" being estimated to correspond to the rotational position of the magnetic pole of the U phase (first phase) of the rotor 3 and prescribing the time when the first reference period "T" has elapsed from the first edge "E1" of the reference pulse signal "IHU".

In other words, the controlling part CON estimates the rotational position of the three-phase brushless motor 1 by determining which of the six divisional periods of one cycle of rotation of the rotor 3 is the current period based on the edge of the pulse of the reference pulse signal "IHU", the first timing "X1", the second timing "X2" and the third timing "X3". And the controlling part CON controls the motor driver D in the driving pattern assigned to the estimated rotational position.

For example, the controlling part CON controls the motor driver D in the driving pattern (0) for a period of one third of the first reference period "T" from the second edge "E2" (a period from the timing of the second edge "E2" to the timing when the pulse of the second estimation pulse signal "TMW" rises).

Then, the controlling part CON controls the motor driver D in the driving pattern (1) for a period from the timing when the pulse of the second estimation pulse signal "TMW" rises to the timing when the pulse of the first estimation pulse signal "TMV" rises.

Then, the controlling part CON controls the motor driver D in the driving pattern (2) for a period from the timing when the pulse of the first estimation pulse signal "TMV" rises to the timing of the first edge "E1".

Then, the controlling part CON controls the motor driver D in the driving pattern (3) for a period from the timing of the first edge "E1" to the first timing "X1".

Then, the controlling part CON controls the motor driver D in the driving pattern (4) for a period from the first timing "X1" to the second timing "X2".

Then, the controlling part CON controls the motor driver D in the driving pattern (5) for a period from the second timing "X2" to the timing "Xa" of the third edge "E3" (third timing "X3").

Then, the controlling part CON controls the motor driver D in the driving pattern (0) for a period from the timing "Xa" of the third edge "E3" (third timing "X3") to the fourth timing "X4". That is, in the case where the third edge "E3" occurs at the third timing "X3", at the timing "Xa" of the third edge "E3", the controlling part CON starts controlling the motor driver D in the driving pattern (0) prescribed so as to correspond to the rotational position of the three-phase brushless motor 1 estimated from the reference pulse signal "IHU", the first timing "X1", the second timing "X2" and the third timing "X3".

Then, the controlling part CON controls the motor driver D in the driving pattern (1) for a period from the fourth timing "X4" to the fifth timing "X5".

As described above, the controlling part CON controls the motor driver in the driving patterns (0), (1), (2), (3), (4) and (5) sequentially prescribed so as to correspond to the estimated rotational position of the three-phase brushless motor 1.

As described above, in the constant speed condition in which the first reference period "T" and the second reference period "T'" are equal to each other as shown in FIG. 2, the processing based on the reference pulse signal "IHU" and the processing of the third estimation pulse signal "TMU" occur concurrently. In this case, as described above, the controlling part CON assigns priority to the processing based on the reference pulse signal "IHU", which is input from the sensor. The processing of the third estimation pulse signal "TMU" is ignored. In the processing of the reference pulse signal "IHU", the processing of the third estimation pulse signal "TMU" is reset based on the second reference period "T'" as the next timing.

Next, a case where the three-phase brushless motor 1 slowly accelerates ("T'"=⅚ "T") (FIG. 3) will be described.

As shown in FIG. 3, if the third edge "E3" (timing "Xa") occurs between the second timing "X2" and the third timing "X3", the controlling part CON estimates the rotational position of the three-phase brushless motor 1 by determining which of the six divisional periods of one cycle of one rotation of the rotor 3 is the current period based on the edge of the pulse of the reference pulse signal "IHU", the first timing "X1", the second timing "X2" and the third timing "X3". The controlling part CON controls the motor driver D in the driving pattern assigned to the estimated rotational position.

For example, the controlling part CON controls the motor driver D in the driving pattern (0) for a period of one third of the first reference period "T" from the second edge "E2" (a period from the timing of the second edge "E2" to the timing when the pulse of the second estimation pulse signal "TMW" rises).

Then, the controlling part CON controls the motor driver D in the driving pattern (1) for a period from the timing when the pulse of the second estimation pulse signal "TMW" rises to the timing when the pulse of the first estimation pulse signal "TMV" rises.

Then, the controlling part CON controls the motor driver D in the driving pattern (2) for a period from the timing when the pulse of the first estimation pulse signal "TMV" rises to the timing of the first edge "E1".

Then, the controlling part CON controls the motor driver D in the driving pattern (3) for a period from the timing of the first edge "E1" to the first timing "X1".

Then, the controlling part CON controls the motor driver D in the driving pattern (4) for a period from the first timing "X1" to the second timing "X2".

Then, the controlling part CON controls the motor driver D in the driving pattern (5) for a period from the second timing "X2" to the timing "Xa" of the third edge "E3".

Then, the controlling part CON controls the motor driver D in the driving pattern (0) for a period from the timing "Xa" of the third edge "E3" to the fourth timing "X4". That is, in the case where the third edge "E3" occurs between the second timing "X2" and the third timing "X3", at the timing "Xa" of the third edge "E3", the controlling part CON controlls the motor driver D in the driving pattern (0) prescribed so as to correspond to the rotational position of the three-phase brushless motor 1 estimated from the reference pulse signal "IHU", the first timing "X1", the second timing "X2" and the third timing "X3".

Then, the controlling part CON controls the motor driver D in the driving pattern (1) for a period from the fourth timing "X4" to the fifth timing "X5".

As described above, the controlling part CON controls the motor driver in the driving patterns (0), (1), (2), (3), (4) and (5) sequentially prescribed so as to correspond to the estimated rotational position of the three-phase brushless motor 1.

As described above, in the condition in which the three-phase brushless motor 1 is slowly accelerating as shown in FIG. 3, the processing based on the reference pulse signal "IHU", which is input from the sensor, occurs before the processing of the third estimation pulse signal "TMU". In this case, the processing of the third estimation pulse signal "TMU" set based on the preceding first reference period "T"

is cancelled, and the processing of the third estimation pulse signal "TMU" is reset based on the current second reference period "T'".

Next, a case where the three-phase brushless motor 1 sharply accelerates ("T''"=⅓ "T") (FIG. 4) will be described.

As shown in FIG. 4, if the third edge "E3" (timing "Xa") occurs during the second period (⅔ "T") (between the first timing "X1" and the second timing "X2"), the controlling part CON controls the motor driver D in the driving pattern (5) following the driving pattern (4) prescribed so as to correspond to the rotational position of the three-phase brushless motor 1 immediately before the third edge "E3" occurs.

In this case, in particular, up to the time (fourth timing "X4") when the third period (⅓ "T'") has elapsed from the timing of the third edge "E3" (timing "Xa"), the controlling part CON controls the motor driver D in the prescribed sequential driving patterns (5) and (0) so as to continue to the driving pattern (1) that is prescribed so as to correspond to the rotational position of the three-phase brushless motor 1 estimated from the reference pulse signal "IHU", the first timing "X1", the second timing "X2" and the third timing "X3" at the time when the third period (⅓ "T'") has elapsed (fourth timing "X4").

Then, at the time when the third period (⅓ "T'") has elapsed (fourth timing "X4"), the control part CON controls the motor driver D in the driving pattern (1) prescribed so as to correspond to the rotational position of the three-phase brushless motor 1 estimated from the reference pulse signal "IHU", the first timing "X1", the second timing "X2" and the third timing "X3".

It is noted that in the case where the third edge "E3" occurs during the second period (⅔"T'") (between the first timing "X1" and the second timing "X2"), the controlling part CON may control the motor driver D so as to become a state ("F") without any load on the three-phase brushless motor 1.

In this case, for example, the controlling part CON controls the motor driver D to become a state without any load on the three-phase brushless motor 1 (a moter-free state) until the time when the third period (⅓ "T'") elapses (fourth timing "X4").

As described above, in the condition in which the three-phase brushless motor 1 is sharply accelerating as shown in FIG. 4, the processing of the reference pulse signal "IHU", which is input from the sensor, is executed before the processing of the first estimation pulse signal "TMV". If the three-phase brushless motor 1 accelerates at a rate of 60° or more per cycle, one driving pattern is skipped. Thus, to prevent an over-advanced ignition output or an abnormal conduction, the skipped driving pattern is output, or a driving pattern corresponding to the input from the sensor is output after the moter-free state is once entered. The processing of the first estimation pulse signal "TMV" and the processing of the third estimation pulse signal "TMU" set based on the preceding first reference period "T" are cancelled, and the processing of the first estimation pulse signal "TMV" and the processing of the third estimation pulse signal "TMU" are reset based on the current second reference period "T'".

Finally, a case where the three-phase brushless motor 1 decelerates ("T''"=2 "T") (FIG. 5) will be described.

As shown in FIG. 5, if the third edge "E3" of the reference pulse signal "IHU" that immediately follows the first edge "E1" (timing "Xa") does not occur during the first reference period "T" (between the timing of the first edge "E1" and the third timing "X3"), the controlling part CON controls the motor driver D in the prescribed sequential driving patterns (1) and (2), for example.

Alternatively, in the case where the third edge "E3" of the reference pulse signal "IHU" that immediately follows the first edge "E1" does not occur during the first reference period "T" (between the timing of the first edge "E1" and the third timing "X3"), the controlling part CON may control the motor driver D so as to become a state without any load on the three-phase brushless motor 1.

Alternatively, in the case where the third edge "E3" of the reference pulse signal "IHU" that immediately follows the first edge "E1" does not occur during the first reference period "T" (between the timing of the first edge "E1" and the third timing "X3"), the controlling part CON may control the motor driver D so as to short-circuit the coils of the three-phase brushless motor 1, for example.

It is noted that the controlling part CON can determine whether or not the third edge "E3" of the reference pulse signal "IHU" that immediately follows the first edge "E1" has occurred in the first reference period "T" based on the relationship between the third timing "X3" and the third edge "E3" (timing "Xa"), for example.

In short, in any of the case where the three-phase brushless motor 1 rotates at a constant speed, the case where the three-phase brushless motor 1 accelerates and the case where the three-phase brushless motor 1 decelerates, the three-phase motor driving apparatus 100 controls driving of the three-phase brushless motor 1 using only one rotor sensor (reference pulse signal) that detects the magnetic pole of the first phase (U phase, for example) of the rotor 3 of the three-phase brushless motor 1.

As described above, in the condition in which the three-phase brushless motor 1 is decelerating shown in FIG. 5, the processing of the third estimation pulse signal "TMU" is performed, and a delay of the reference pulse signal "IHU", which is input from the sensor, can be detected. As the processing at the third estimation pulse signal "TMU", each coil may be short-circuited or any load on the motor may be removed to output a pattern to stop the advanced ignition output or to recover from the delay while maintaining the current output. In the following reference pulse signal "IHU", the first estimation pulse signal "TMV", the second estimation pulse signal "TMW", and the third estimation pulse signal "TMU" are reset based on the second reference period "T'".

As described above with reference to the embodiment, when the three-phase brushless motor rotates, the three-phase motor driving apparatus according to an aspect of the present invention has a controlling part that estimates the rotational position of the three-phase brushless motor based on the reference pulse signal output by the rotor sensor according to the rotational position of the magnetic pole of the first phase of the rotor and controls the motor driver in the driving patterns sequentially prescribed so as to correspond to the estimated rotational position of the three-phase brushless motor.

The controlling part estimates the rotational position of the three-phase brushless motor based on the reference pulse signal, the first timing, the second timing and the third timing, the first timing being estimated to correspond to the rotational position of the magnetic pole of the second phase of the rotor and prescribing the time when the first period, which is one third of the first reference period, has elapsed from the first edge of the reference pulse signal, the second timing being estimated to correspond to the rotational position of the magnetic pole of the third phase of the rotor and prescribing the time when the second period, which is two thirds of the first reference period, has elapsed from the first edge of the reference pulse signal, and the third timing being estimated to correspond to the rotational position of the magnetic pole of the first phase of the rotor and prescribing the time when the first reference period has elapsed from the first edge of the reference pulse signal.

The first reference period is the period between two adjacent edges of the reference pulse signal. In particular, the first reference period is the period between the first edge and the second edge of the reference pulse signal that immediately precedes the first edge.

In this way, the number of rotor sensors can be smaller than conventional apparatus, and the rotational position of the rotor can be more properly estimated in response to the variation of the rotation speed of the three-phase brushless motor.

In addition, the number of expensive rotor sensors and the number of harnesses and terminals to be connected to the rotor sensors can be reduced.

In addition, since the number of rotor sensors can be reduced, the yield of the products can be improved accordingly.

As a result, the manufacturing cost of the controlling system for a cell and a dynamo, to which the three-phase motor driving method and the three-phase motor driving apparatus according to the present invention are applied, can be reduced, for example.

In the embodiment, a case has been described where the magnetic pole of the first phase of the rotor is the magnetic pole of the U phase of the rotor, the magnetic pole of the second phase of the rotor is the magnetic pole of the V phase of the rotor, and the magnetic pole of the third phase of the rotor is the magnetic pole of the W phase of the rotor.

However, the description holds true for cases where the magnetic pole of the first phase of the rotor is the magnetic pole of the W phase of the rotor, the magnetic pole of the second phase of the rotor is the magnetic pole of the U phase of the rotor, and the magnetic pole of the third phase of the rotor is the magnetic pole of the V phase of the rotor or where the magnetic pole of the first phase of the rotor is the magnetic pole of the V phase of the rotor, the magnetic pole of the second phase of the rotor is the magnetic pole of the W phase of the rotor, and the magnetic pole of the third phase of the rotor is the magnetic pole of the U phase of the rotor.

The embodiment is given for illustrative purposes, and the scope of the present invention is not limited to the embodiment.

The invention claimed is:

1. A three-phase motor driving apparatus for controlling driving of a three-phase brushless motor using only one rotor sensor that detects a magnetic pole of a first phase of a rotor of the three-phase brushless motor, comprising: a motor driver that supplies a driving current to the three-phase brushless motor to drive the three-phase brushless motor and a controlling part that estimates a rotational position of the three-phase brushless motor based on a reference pulse signal output by the rotor sensor according to a rotational position of the magnetic pole of the first phase of the rotor when the three-phase brushless motor rotates, and controls the motor driver in driving patterns sequentially prescribed so as to correspond to the estimated rotational position of the three-phase brushless motor, wherein the controlling part estimates the rotational position of the three-phase brushless motor based on the reference pulse signal, a first timing, a second timing and a third timing, the first timing being estimated to correspond to a rotational position of a magnetic pole of a second phase of the rotor and prescribing a time when one third of a first reference period has elapsed from a first edge of the reference pulse signal, the second timing being estimated to correspond to a rotational position of a magnetic pole of a third phase of the rotor and prescribing a time when two thirds of the first reference period have elapsed from the first edge of the reference pulse signal, and the third timing being estimated to correspond to the rotational position of the magnetic pole of the first phase of the rotor and prescribing a time when the first reference period has elapsed from the first edge of the reference pulse signal, and the first reference period is a period between the first edge and a second edge of the reference pulse signal that immediately precedes the first edge.

2. The three-phase motor driving apparatus according to claim 1, wherein the controlling part prescribes a fourth timing that prescribes a time when one third of a second reference period has elapsed from a third edge of the reference pulse signal that immediately follows the first edge, prescribes a fifth timing that rises when two thirds of the second reference period have elapsed from the third edge, and prescribes a sixth timing that is estimated to correspond to the rotational position of the magnetic pole of the first phase of the rotor and prescribes a time when the second reference period has elapsed from the third edge of the reference pulse signal, and the second reference period is a period between the first edge and the third edge.

3. The three-phase motor driving apparatus according to claim 2, wherein in a case where the third edge occurs between the first timing and the second timing, the controlling part controls the motor driver so as to become a state without any load on the three-phase brushless motor.

4. The three-phase motor driving apparatus according to claim 3, wherein in the case where the third edge occurs between the first timing and the second timing, before the fourth timing, the controlling part controls the motor driver to become a state without any load on the three-phase brushless motor and then controls the motor driver in a driving pattern for the third edge.

5. The three-phase motor apparatus method according to claim 2, wherein in the case where the third edge occurs between the first timing and the second timing, the controlling part controls the motor driver in a driving pattern that follows a driving pattern prescribed so as to correspond to the rotational position of the three-phase brushless motor immediately before the third edge occurs.

6. The three-phase motor apparatus according to claim 5, wherein the controlling part controls the motor driver in prescribed sequential driving patterns from a timing of the third edge to the fourth timing.

7. The three-phase motor driving apparatus according to claim 2, wherein in a case where the third edge does not occur before the third timing, the controlling part controls the motor driver so as to become a state without any load on the three-phase brushless motor.

8. The three-phase motor driving apparatus according to claim 2, wherein in the case where the third edge does not occur before the third timing, the controlling part controls the motor driver so as to short-circuit coils of the three-phase brushless motor.

9. The three-phase motor driving apparatus according to claim 2, wherein in a case where the third edge occurs at the third timing, at a timing of the third edge, the motor driver is controlled in a driving pattern prescribed so as to correspond to the rotational position of the three-phase brushless motor estimated from the reference pulse signal, the first timing, the second timing and the third timing.

10. The three-phase motor driving apparatus according to claim 2, wherein in a case where the third edge occurs between the second timing and the third timing, at a timing of the third edge, the motor driver is controlled in a driving pattern prescribed so as to correspond to the rotational position of the three-phase brushless motor estimated from the reference pulse signal, the first timing and the second timing.

11. The three-phase motor driving apparatus according to claim 1, wherein magnetic pole of the first phase of the rotor is magnetic pole of U phase of the rotor, magnetic pole of the second phase of the rotor is magnetic pole of V phase of the rotor, magnetic pole of the third phase of the rotor is magnetic pole of W phase of the rotor.

12. The three-phase motor driving apparatus according to claim 1, wherein the three-phase motor driving apparatus comprises a reference pulse signal input terminal that receives the reference pulse signal.

13. The three-phase motor driving apparatus according to claim 1, wherein the rotor sensor is disposed inside the stator of the three-phase brushless motor or inside an outer sheath of the three-phase brushless motor.

14. A three-phase motor driving apparatus of controlling driving of a three-phase brushless motor using only one rotor sensor that detects a magnetic pole of a first phase of a rotor of the three-phase brushless motor, comprising:
 a motor driver that supplies a driving current to the three-phase brushless motor to drive the three-phase brushless motor; and
 a controlling part that estimates a rotational position of the three-phase brushless motor based on a reference pulse signal output by the rotor sensor according to a rotational position of the magnetic pole of the first phase of the rotor when the three-phase brushless motor rotates, and controls the motor driver in driving patterns sequentially prescribed so as to correspond to the estimated rotational position of the three-phase brushless motor,
 wherein the controlling part estimates the rotational position of the three-phase brushless motor based on the reference pulse signal, a first timing, a second timing and a third timing, the first timing being estimated to correspond to a rotational position of a magnetic pole of a second phase of the rotor and prescribing a time when one third of a first reference period has elapsed from a first edge of the reference pulse signal, the second timing being estimated to correspond to a rotational position of a magnetic pole of a third phase of the rotor and prescribing a time when two thirds of the first reference period have elapsed from the first edge of the reference pulse signal, and the third timing being estimated to correspond to the rotational position of the magnetic pole of the first phase of the rotor and prescribing a time when the first reference period has elapsed from the first edge of the reference pulse signal, and the first reference period is a period between two adjacent edges of the reference pulse signal.

* * * * *